United States Patent
In et al.

(10) Patent No.: US 7,953,953 B2
(45) Date of Patent: May 31, 2011

(54) METHOD AND APPARATUS FOR REDUCING PAGE REPLACEMENT TIME IN SYSTEM USING DEMAND PAGING TECHNIQUE

(75) Inventors: Ji-hyun In, Seoul (KR); Il-hoon Shin, Suwon-si (KR); Hyo-jun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 11/640,241

(22) Filed: Dec. 18, 2006

(65) Prior Publication Data

US 2007/0168627 A1    Jul. 19, 2007

(30) Foreign Application Priority Data

Jan. 13, 2006  (KR) ..................... 10-2006-0004140

(51) Int. Cl.
*G06F 12/00* (2006.01)
(52) U.S. Cl. ........ 711/208; 711/209; 711/206; 711/159; 711/160; 711/202
(58) Field of Classification Search .................. 711/159, 711/202, 208, 209, 206, 160
See application file for complete search history.

(56) References Cited

U.S. PATENT DOCUMENTS

| | | | | |
|---|---|---|---|---|
| 4,868,738 A | * | 9/1989 | Kish et al. ....................... 710/26 |
| 5,016,164 A | * | 5/1991 | Srivastava ....................... 712/228 |
| 5,237,673 A | * | 8/1993 | Orbits et al. .................... 711/170 |
| 5,394,537 A | * | 2/1995 | Courts et al. .................... 711/202 |
| 5,555,399 A |   | 9/1996 | Waldron et al. |
| 5,606,685 A | * | 2/1997 | Frandeen ........................ 711/117 |
| 5,721,917 A | * | 2/1998 | Elliott et al. ................... 718/101 |
| 5,754,817 A | * | 5/1998 | Wells et al. .................... 711/203 |
| 2004/0019891 A1 | * | 1/2004 | Koenen ........................... 718/102 |

FOREIGN PATENT DOCUMENTS

| | | |
|---|---|---|
| JP | 06131262 A | 5/1994 |
| JP | 7114499 A | 5/1995 |
| JP | 07152574 A | 6/1995 |
| JP | 07-244614 A | 9/1995 |
| JP | 2005141637 A | 6/2005 |
| KR | 20030070119 A | 8/2003 |
| KR | 10-0454119 B1 | 10/2004 |
| KR | 10-2005-0075533 A | 7/2005 |
| WO | 97/39407 A1 | 10/1997 |
| WO | 02058074 A2 | 7/2002 |

* cited by examiner

*Primary Examiner* — Mardochee Chery
(74) *Attorney, Agent, or Firm* — Sughrue Mion, PLLC

(57) ABSTRACT

A method and apparatus for reducing a page replacement time in a system using a demand paging technique are provided. The apparatus includes a memory management unit which transmits a signal indicating that a page fault occurs, a device driver which reads a page having the page fault from a nonvolatile memory, and a page fault handler that searches and secures a space for storing the page having the page fault in a memory. The searching and securing of the space in the memory is performed within a limited time calculated beforehand and a part of data to be loaded to the memory of the system is stored in the nonvolatile memory.

17 Claims, 9 Drawing Sheets

METHOD AND APPARATUS FOR REDUCING PAGE REPLACEMENT TIME IN SYSTEM USING DEMAND PAGING TECHNIQUE

CROSS REFERENCE TO RELATED APPLICATION

This application claims priority from Korean Patent Application No. 10-2006-0004140 filed on Jan. 13, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to a demand paging technique, and more particularly, to a technique for reducing the page replacement time in a system using such a demand paging technique.

2. Description of the Related Art

The demand paging technique is a technique of allocating a virtual memory to an auxiliary storage device, such as a hard disk, in an operating system using a virtual memory system and to perform physical memory mapping in accordance with a user's request so as to efficiently use a limited main memory. A flash memory is nonvolatile and is rapidly accessed, like the hard disk, with low power consumption. Accordingly, the flash memory has been applied to an embedded system or a mobile device.

The procedure of demand paging is as follows. When a page fault occurs, a page fault handler first secures a physical memory space for loading the corresponding page having the page fault. When there is no available physical memory space, the page fault handler replaces the corresponding page with a page allocated beforehand so as to secure the physical memory space. After securing the physical memory space, the fault handler searches an address of the nonvolatile storage device in which the page having the page fault is stored. Then, the fault handler reads the corresponding page from the nonvolatile storage device and updates a memory mapping table.

FIG. 1 is a diagram showing a demand paging process according to the relationship between a software process and a device I/O with respect to time.

Data is read from a device when the page fault occurs. A page fault handler 10 first reads data from the device and secures a memory space for storing the data. Then, the page fault hander 10 searches an address of the page having the page fault and creates a command READ_CMD so as to read data of the corresponding page. When the command is transmitted to the device, the device transmits the data after a time corresponding to a busy time passes. The busy time is the time required for performing a preceding operation so as to read the data stored in the corresponding page. For example, when data is read from a flash memory, a column signal and a row signal are transmitted to a region in which the corresponding page is stored, to thereby read the corresponding data. It takes time to perform the above-described processes. After this time passes, the data of the corresponding page can be transmitted from the flash memory. When the data is transmitted from the device, the page fault handler updates the mapping table and stores the received data.

Referring to FIG. 1, the page replacement operation needs a plurality of processes, for example, of reading data from the device and arranging a page fault result, and thus the reduction in the number of page replacement times may have a large effect on system performance.

A Least Recently Used (LRU) algorithm can be exemplified as the optimum page replacement algorithm. The LRU algorithm is a method that determines a page least recently used as a target of the replacement. However, in order to apply an LRU page replacement policy to demand paging, hardware support is required. However, there is no hardware support for the LRU page replacement policy in most systems. Therefore, an algorithm, such as a clock algorithm or Mach 2.5, similar to the LRU algorithm, has been generally used.

The known paging techniques process demand paging on the basis of a nonvolatile storage device, such as a hard disk, but do not consider the characteristics of the nonvolatile storage device, such as a flash memory. A method of reading data from a hard disk is different from a method of reading data from a flash memory. However, in the paging technique, this difference is not considered.

In case of the hard disk, data can be read from a nonvolatile storage device to a physical memory by using addresses of the physical memory and the nonvolatile storage device. However, in case of the nonvolatile storage device, such as a flash memory, having a buffer (or register) in a device, data should be loaded to the buffer (or register) in the nonvolatile storage device before reading the data into the physical memory (RAM). Then, the data is loaded to the physical memory from the buffer or register. In the flash memory, if a read command is issued with an address of the nonvolatile storage device, the data is loaded to the buffer (register) after the read command is issued. When the data is loaded, the device is in a busy state. Generally, the time of the busy state is usually 23 µsec to 35 µsec but varies according to the flash memories.

Other than the above-described cases, when the paging technique is applied, unnecessary operations may be continuously repeated. Therefore, a method and apparatus for reducing a page replacement time in demand paging is desired.

SUMMARY OF THE INVENTION

The Exemplary embodiments of the present invention have been finalized in order to overcome the above-described problems and other problems not described above. Also, the present invention is not required to overcome the problems described above, and an exemplary embodiment of the present invention may not overcome any of the problems described above. Accordingly, it is an aspect of the present invention to apply a demand paging technique in view of characteristics of a nonvolatile storage memory, such as a flash memory.

Another aspect of the present invention is to improve system performance by performing another operation while data is being read from a nonvolatile storage device.

Aspects of the present invention are not limited to those mentioned above, and other aspects of the present invention will be apparently understood by those skilled in the art through the following description.

According to an aspect of the invention, a method of reducing the page replacement time in a system using a demand paging technique includes receiving a signal indicating that a page fault occurs, reading a page having the page fault from a nonvolatile memory, and searching and securing a space for storing the page having the page fault in a memory. The searching and securing of the space in the memory is performed within a limited time calculated beforehand, and a part of data to be loaded to the memory of the system is stored in the nonvolatile memory.

According to another aspect of the invention, an apparatus for reducing the page replacement time in a system using a demand paging technique includes a nonvolatile storage device holding stored data with no power supply, a memory receiving and storing the data from the nonvolatile storage device and managing the data through demand paging, the data being stored only with the power supply, a memory management unit transmitting a signal, which indicates that a page fault occurs in the memory, a page fault handler extracting information of the page having the page fault and searching and securing a space for storing the page having the page fault in the memory, and a device driver transmitting information of the page having the page fault to the nonvolatile storage device and receiving data from the nonvolatile storage device. The page fault handler operates within a limited time calculated beforehand.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Figure 1:
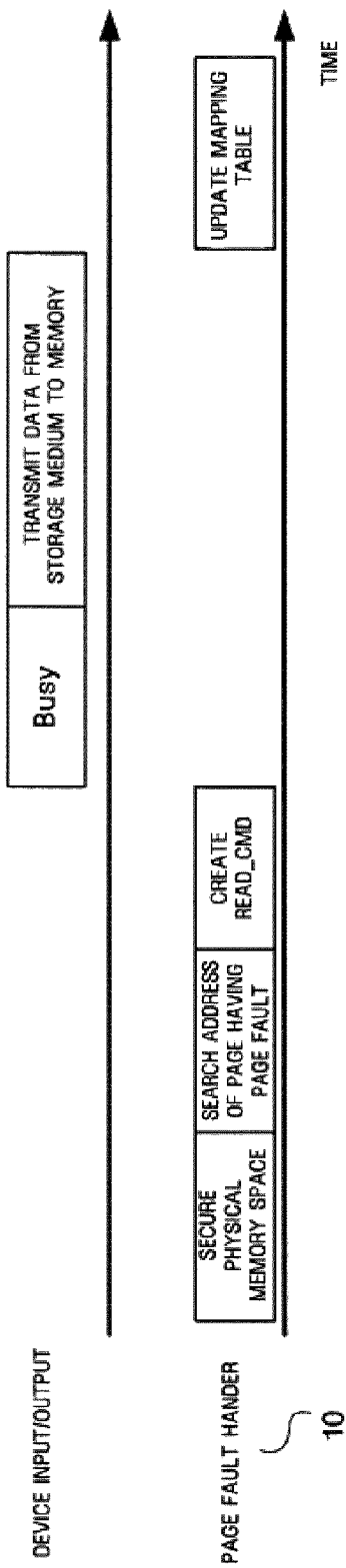
FIG. 1 is a diagram showing a demand paging process according to the relationship between a software process and a device I/O as time passes.

The various aspects and features of the present invention and methods of accomplishing the same may be understood more readily by reference to the following detailed description of exemplary preferred embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

Hereinafter, the invention will be described hereinafter with reference to block diagrams or flowchart illustrations of a method and apparatus for reducing a page replacement time in a system using a demand paging technique according to an exemplary embodiment thereof. It will be understood that each of blocks of the flowchart and combination of the flowchart can be executed by using computer program instructions. Since the computer program instructions can be included in a processor of a general computer, a special-purpose computer, or a programmable data processing device, the instructions executed by the processors of the computer or another programmable data processing device may create a unit that executes functions described in the block of the flowchart. Theses computer program instructions can be stored in a computer usable memory or computer readable memory that can aim at a computer or another programmable data processing device so as to implement the computer program instruction in a specific manner. The instructions stored in the computer usable memory or the computer readable memory can produce manufacture items including the instruction units that execute the functions described in the blocks in the block of the flowchart. Since the computer program instructions can be included in a computer or another programmable data processing device, the instructions that create a process in which a series of operation stages are performed on the computer or another programmable data processing device and executed by a computer and causes the computer or another programmable data processing device to be performed can supply procedures so as to execute the functions described in the blocks of the flowchart.

Further, each block can represent a module, a segment, or a portion of codes that includes one and more executable instructions for executing specific logic functions. In addition, in some modified embodiments, it should be understood that the function described in the blocks can be executed in disorder. For example, adjacent two blocks can be substantially performed at the same time or can be performed in reverse order in accordance with a function corresponding to the block.

In a nonvolatile storage device, such as a flash memory, a process of loading data from the nonvolatile storage device to a buffer or a register is independently performed from a process of transmitting the data loaded in the buffer or the register to a physical memory (RAM). Accordingly, an operation, such as replacement page selection, may be performed when the data is being loaded from a memory cell to the buffer or register, thereby reducing a time required for a demand paging process. Further, a memory mapping table can be updated, or a Translation Lookaside Buffer (TLB) or a cache can be invalidated when a device is in a busy state, in addition to the replacement page selection. The update of the memory mapping table, or the TLB or cache invalidation is necessary as a process of the demand paging operation.

As described above, in order to read data from a device, on which a flash memory is mounted, a read command and an address are issued and then corresponding data is transmitted to a host from the device after a period of time. This is because that, in the structure of the flash memory, in order to load data stored in a cell of the nonvolatile storage device to a volatile storage device, such as the buffer or register, time is required.

If the time required for loading the data stored in the cell of the flash memory to the buffer is efficiently used, it is possible to reduce the data loading time in the flash memory.

Figure 2:
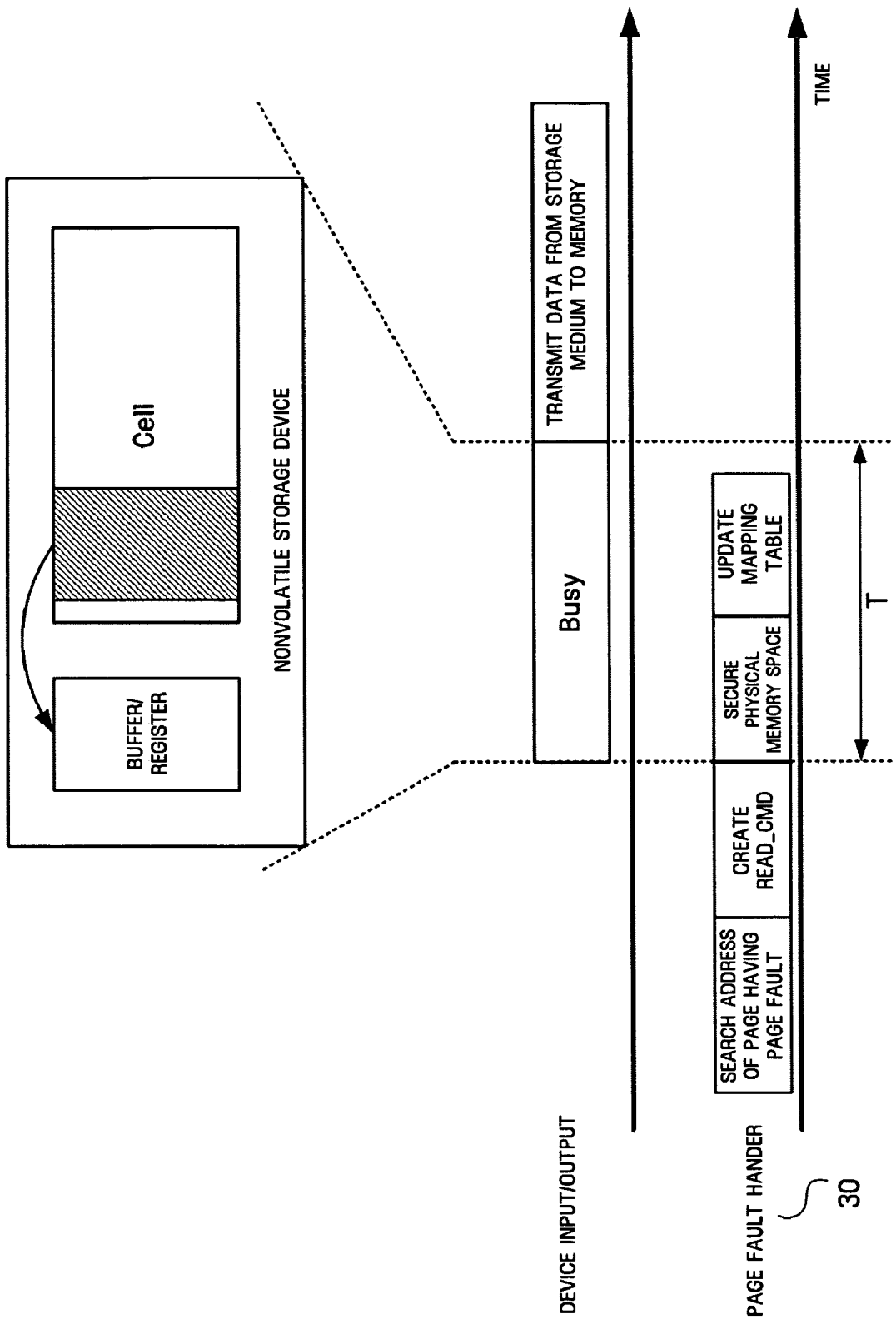
FIG. 2 is a time chart showing a paging process while reducing a data loading time according to an exemplary embodiment of the invention.

FIG. 2 is a time chart showing a paging process while reducing a data loading time according to an exemplary embodiment of the invention. As compared with FIG. 1, a physical memory space is secured and a mapping table is updated when the device is in a "busy" state. When a page fault handler generates a command READ_CMD, data is loaded to the buffer or register from a cell of the flash memory. In this case, the page fault handler can perform an independent operation during a time T when the device is in the "busy" state. Referring to FIG. 2, it is possible to reduce the time by securing the physical memory space while updating the mapping table.

Figure 3:
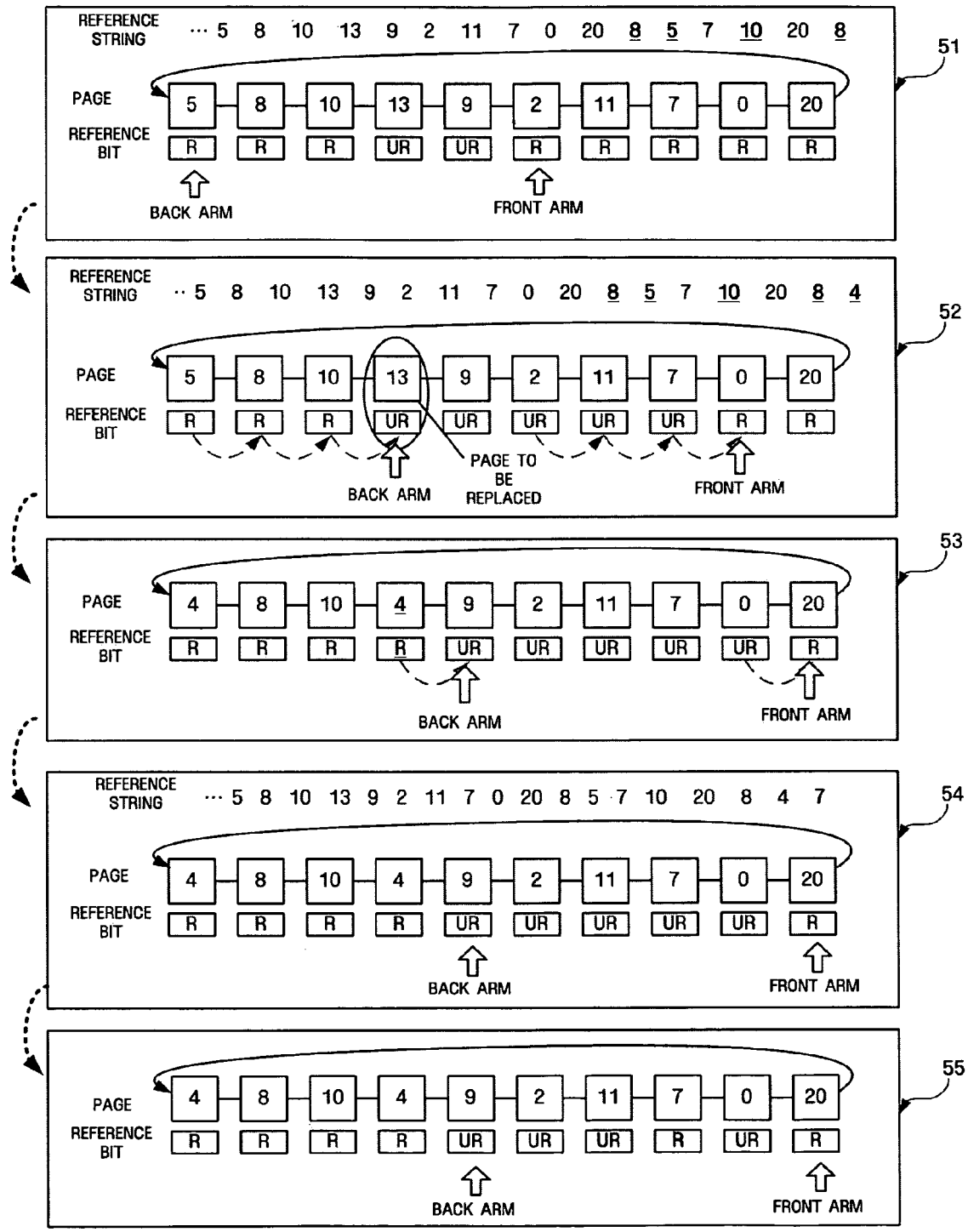
FIG. 3 is a diagram showing the operation of a clock algorithm to which a process of reducing a page replacement time used according to the exemplary embodiment of the invention is applied.

FIG. 3 is a diagram showing the operation of a clock algorithm to which the process of reducing a page replacement time according to the exemplary embodiment of the invention is applied.

The clock algorithm is a kind of First in First Out (FIFO) replacement algorithm. A back arm serves as a pointer that indicates the oldest entry page in a queue. Upon the selection of a page to be replaced (replacement page), a reference bit of the page indicated by the back arm is checked. If a reference bit of the corresponding page is unreferenced (UR) indicating that it is not referenced, the corresponding page is selected as the replacement page. If the reference bit of the corresponding page is referenced (R), the corresponding page has one more chance and the back arm shifts to the next page and a reference bit of the page indicated by the back arm is checked. Upon the movement of the back arm, a front arm serving as a pointer moves while the reference bit of the page indicated by the front arm to UR is changed. In such a manner, the back arm and the front arm are moved. If a page having a reference bit UR indicated by the back arm is found, the corresponding page is selected as the replacement page.

FIG. 3 is a diagram showing a process of selecting a replacement page using the clock algorithm. In a block 51, since the back arm indicates a page having a reference bit R, the back arm and the front arm shift to the next until the back arm finds a page having a reference bit UR. As a result, as shown in a block 52, after the back arm shifts three times, a page 13 is selected as a replacement page. Further, the front arm also shifts three times, and the back arm shifts three times. During the movement, the front arm sets reference bits of pages 2, 11, and 7 to the UR state. As shown in a block 53, after the replacement pages are selected, a new page 4 is allocated and both the back arm and the front arm shift once. A block 54 shows an example of a case where the page 7 having a reference bit UR is referenced again in the block 53. In the clock algorithm, if a page having a reference bit UR is referenced, the reference bit is changed to R from UR. As a result, as shown in a block 55, the reference bit of the page 7 is changed to "R".

Figure 4:
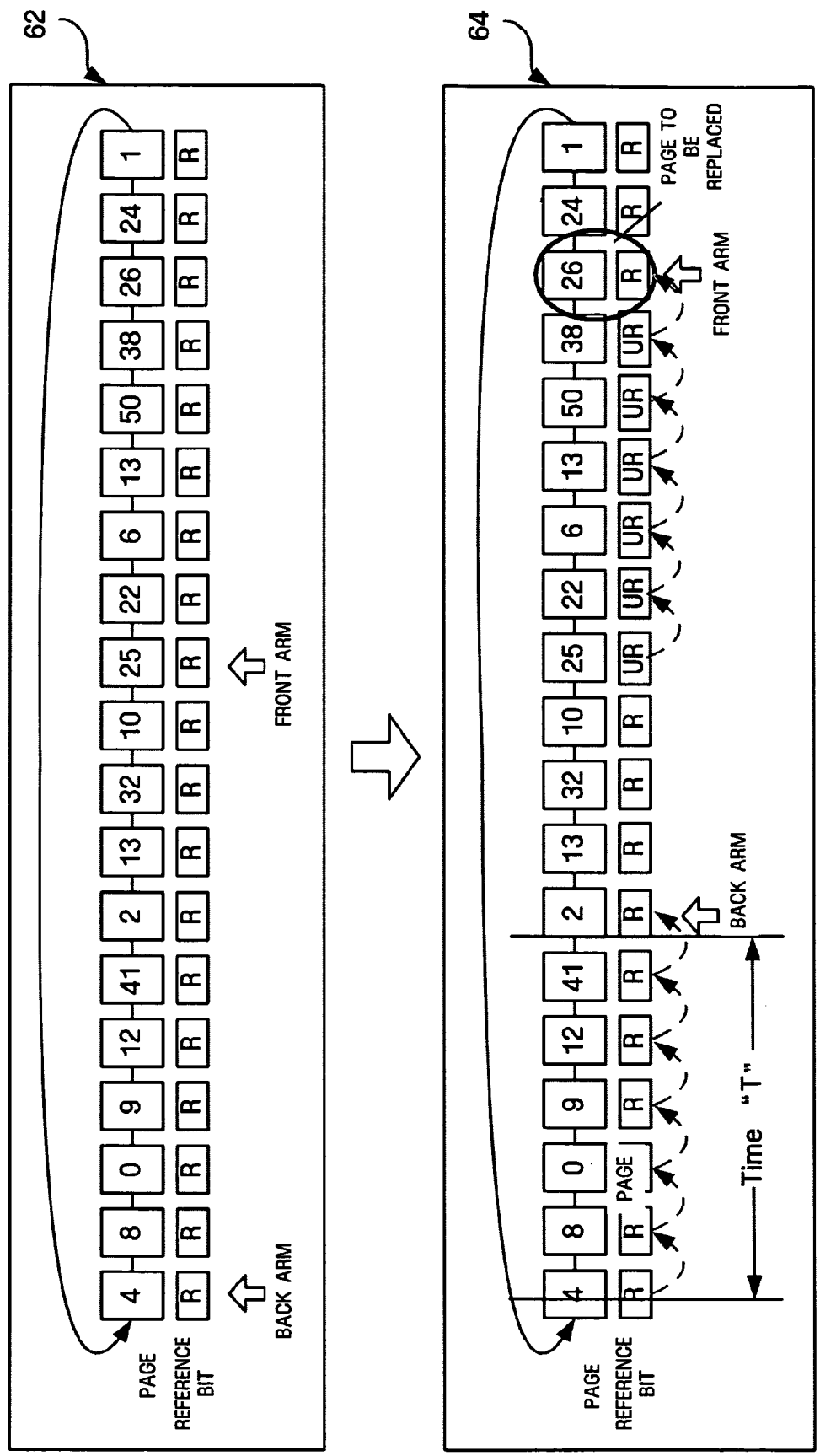
FIG. 4 is a diagram showing the process of reducing a page replacement time in the clock algorithm shown in FIG. 3 according to the exemplary embodiment of the invention.

FIG. 4 is a diagram showing a process of reducing a page replacement time in the clock algorithm shown in FIG. 3 according to the exemplary embodiment of the invention. In FIG. 3, the back arm shifts until a page having a reference bit UR is referenced and the front arm shifts a pointer in accordance with the back arm's movement and changes the reference bit to UR from R. However, in a case where all pages between the back arm and the front arm have the reference bit R, a pointer shifts as many as the number of pages between the back arm and front arm. Then, the back arm replaces a page whose reference bit has been changed to UR by the front arm. In a block 62 shown in FIG. 4, when all the pages between the back arm and the front arm have a reference bit R, the back arm should move to a page 25 and the front arm should continuously change the reference bits of pages to UR from the page 25. However, this could be a waste of time. Therefore, in FIG. 4, the back arm searches a page having the reference bit UR within a predetermined time T. Even if the back arm does not find a page having the reference bit UR, a page having the reference bit R is set to the replacement page after the predetermined time T.

In a block 64 shown in FIG. 4, the back arm searches a page having the reference bit UR within a predetermined time T but does not find the corresponding page having the reference bit UR. When the back arm is shifted, the front arm is shifted and changes a reference bit of each page indicated by the front arm to UR during the predetermined time T.

When the predetermined time T elapses, the back arm indicates a page 2 and the front arm indicates a page 26 and both pages have the reference bit R. Although both the back arm and the front arm indicate pages having the reference bit R, it is possible to set the corresponding pages as the replacement page. In a block 64, the page 26 indicated by the front arm is set as the replacement page. In addition, the page 2 indicated by the back arm can be also set to the replacement page.

The predetermined time T can be set to vary according to the various systems implementing the clock algorithm. At this time, when the data is read from the nonvolatile storage device, such as the flash memory (busy state) shown in FIG. 2, a page can be searched by shifting the back arm and the front arm. A system cannot read data from the nonvolatile storage device during the busy state. Therefore, it is possible to reduce a required time if a page fault processing is performed during the busy state.

In FIG. 4, in order to reduce a time required to shift the back arm and the front arm for page replacement, a limited time T is set. As one example, the limited time T is set to overlap a time required for reading data from the nonvolatile storage device.

Figure 5:
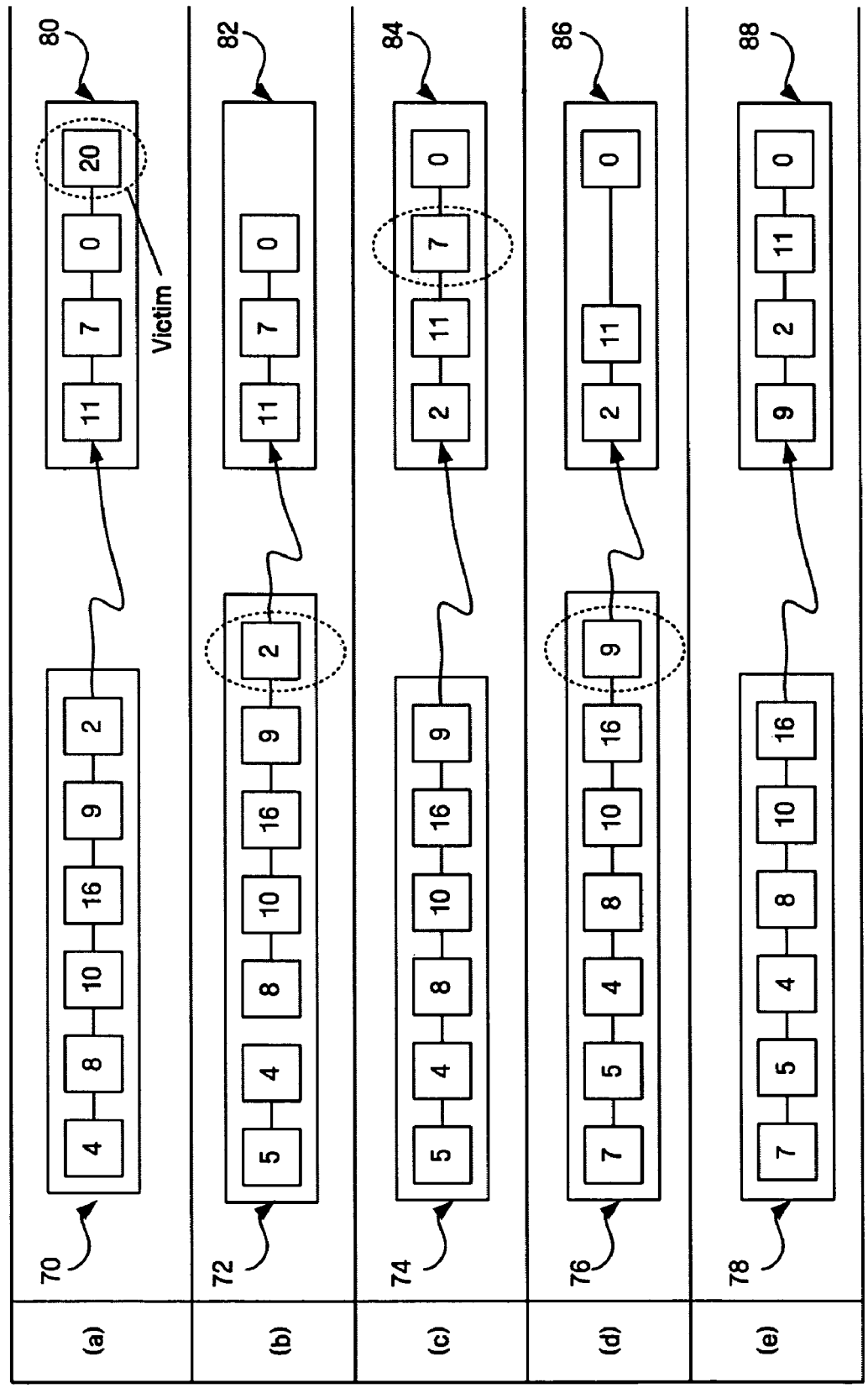
FIG. 5 is a diagram showing a process of selecting a replacement page in a Mach 2.5 algorithm.

FIG. 5 is a diagram showing a process of selecting a replacement page using the Mach 2.5 algorithm.

In the Mach 2.5 algorithm, a page is managed in a stack manner. A page recently referenced is placed on top of the stack and a page referenced least recently is placed on the bottom of the stack. Upon the page replacement, the page placed on the bottom of the stack is selected such that the page least recently referenced becomes the replacement page.

In the Mach 2.5 algorithm, pages are managed to be divided into a valid list and an invalid list. In the valid list, a page fault does not occur. Accordingly, it cannot be checked whether or not the page is referenced in the valid list. In the invalid list, pages are loaded on a physical memory but are invalid such that a pseudo page fault can occur so as to check whether or not the corresponding page is referenced. Therefore, recently referenced pages are stacked in the valid list. Whenever a new page is inserted into the valid list, a page least recently added in the valid list is stacked in the invalid list. If a page included in the invalid list is referenced, the corresponding page is placed on the top of the valid list and managed as a page most recently referenced.

FIG. 5 shows an example of the Mach 2.5 algorithm of selecting a replacement page and adding a newly referenced page to the list. A last page in the invalid list becomes the replacement page according to the Mach 2.5 algorithm. Further, a page newly added is placed on the top of the valid list. At this time, the last page included in the valid list is moved to the invalid list.

In a block (a), reference numbers 70 and 80 represent a valid list and an invalid list, respectively. A page 4 is a most recently referenced page and a page 20 included in the invalid list will be replaced first. In order to refer to a page 5, the page 20 in the invalid list 80 is replaced. A block (b) shows the replacement result. The page 20 is removed from the invalid list 82, a memory space allocated for the page 20 is allocated to the page 5, and the page 5 exists in the valid list 72.

The page 2, which is the last page of the valid list 72, is moved to the invalid list 82. Therefore, the page 2 is moved from the valid list 74 to the invalid list 84, as shown in a block (c).

As shown in the block (c), when a page 7 included in the invalid list 84 is referenced, the page 7 is moved to the valid list. As a result, the page 7 is removed from the invalid list 86 and added to the top of the valid list 76, as shown in a block (d). Further, the page 9 included in the valid list 76 should be moved to the invalid list 86. In a block (e), the page 9 is moved from the valid list 78 to the invalid list 88.

According to the operation of the Mach 2.5 algorithm shown in FIG. 5, whenever the page is replaced, a page included in the valid list is moved to the invalid list. That is, when a page included in the invalid list is referenced, the corresponding page is inserted into the top of the valid list and one of the pages included in the valid list is moved to the invalid list. Therefore, in the Mach 2.5 algorithm, list management overhead may occur when a page is referenced.

It takes a long time to perform the above-described operations whenever the page is referenced. Accordingly, a time required for the overall operation may be reduced by moving the invalid list at another point in time.

Figure 6:
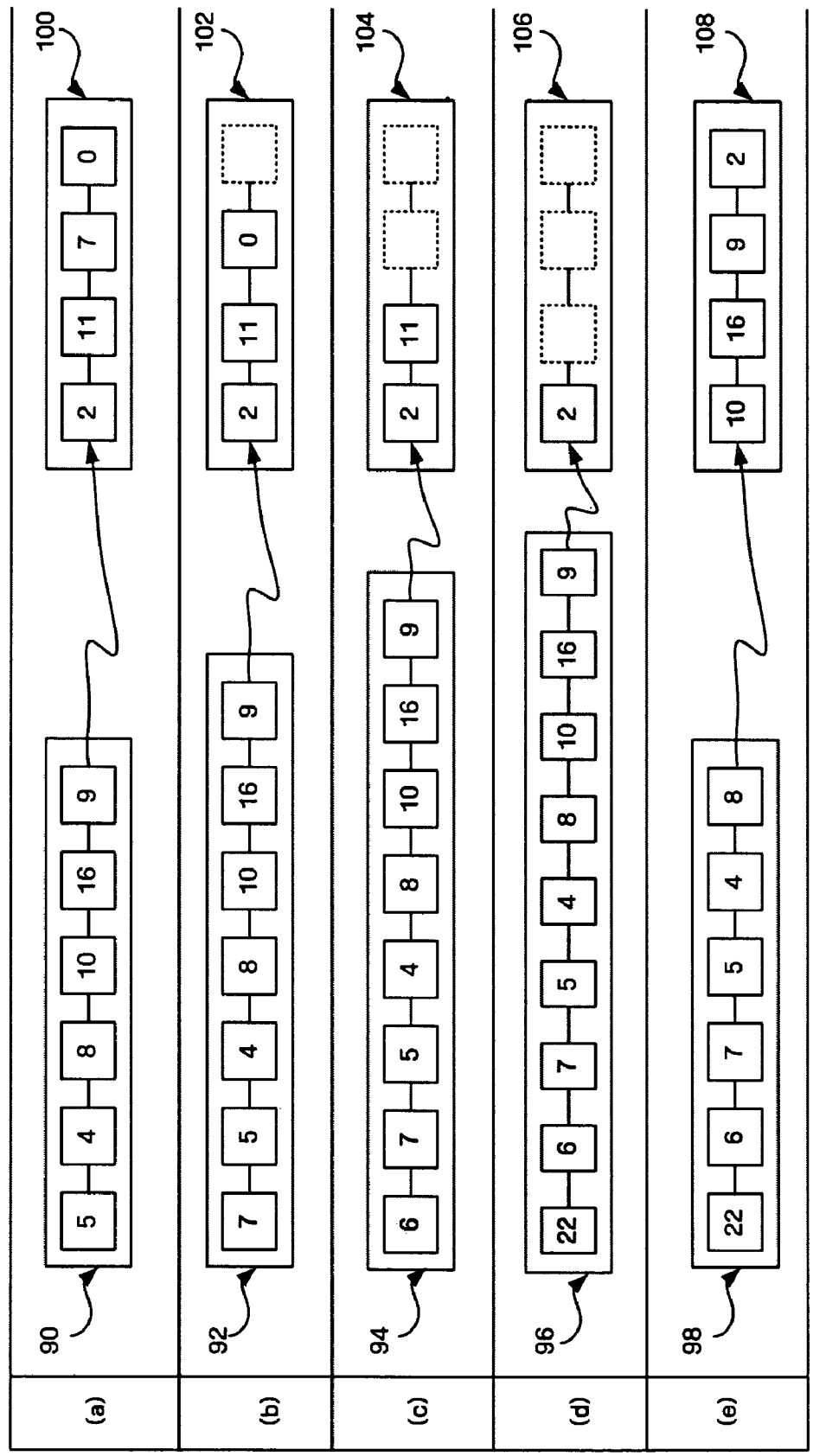
FIG. 6 is a diagram showing a process of rearranging a movement point of an invalid list in the Mach 2.5 algorithm shown in FIG. 5 according to the exemplary embodiment of the invention.

FIG. 6 is a diagram showing a process of rearranging a movement point of the invalid list in the Mach 2.5 algorithm shown in FIG. 5 according to an exemplary embodiment of the invention.

In FIG. 6, a time required for selecting a page to be replaced means a time when the system does not perform any operations and can be exemplified as a time when a device waits to read data.

When the replacement page selection or the invalid or valid lists update is not performed within the predetermined time required for selecting a page to be replaced, a portion of operations can be performed during a device waiting time, thereby improving demand paging processing performance.

In a block (a), a page 7 included in an invalid list 100 is referenced. As a result, as shown in a block (b), the page 7 is removed from an invalid list 102 and inserted into the top of valid list 90 resulting in a valid list 92. In FIG. 5, the last page of the valid list is moved to the invalid list. However, in FIG. 6, this operation is not performed at this time.

In a block (c), a new page 6 is referenced in the state of the block (b). In order to allocate a new page, a replacement page included in an invalid list 104 is added to a valid list 94, and then the page 6 is allocated. Meanwhile, as described above, a page included in the valid list 94 is not moved to the invalid list 104.

In a block (d), a new page 22 is referenced. As a result, the new page 22 is added to a valid list 96 and one page is removed from an invalid list 106. A process of moving a page from the valid list 96 to an invalid list is omitted.

When the paging process is performed, if a device is in a "busy" period shown in FIG. 2, the device moves the page or pages included in a valid list 98 to an invalid list 108.

That is, as many as the number of increased pages compared to the initial number of pages included in the valid list may be extracted from the last portion of the valid list and moved to the invalid list. At this time, if a large number of pages should be moved to the invalid list, the number of pages not moved within the predetermined time may be processed in view of the "busy" time of the device when next new pages are referenced. Accordingly, it is possible to prevent the time required for processing demand paging from being increased over the predetermined time.

Figure 7:
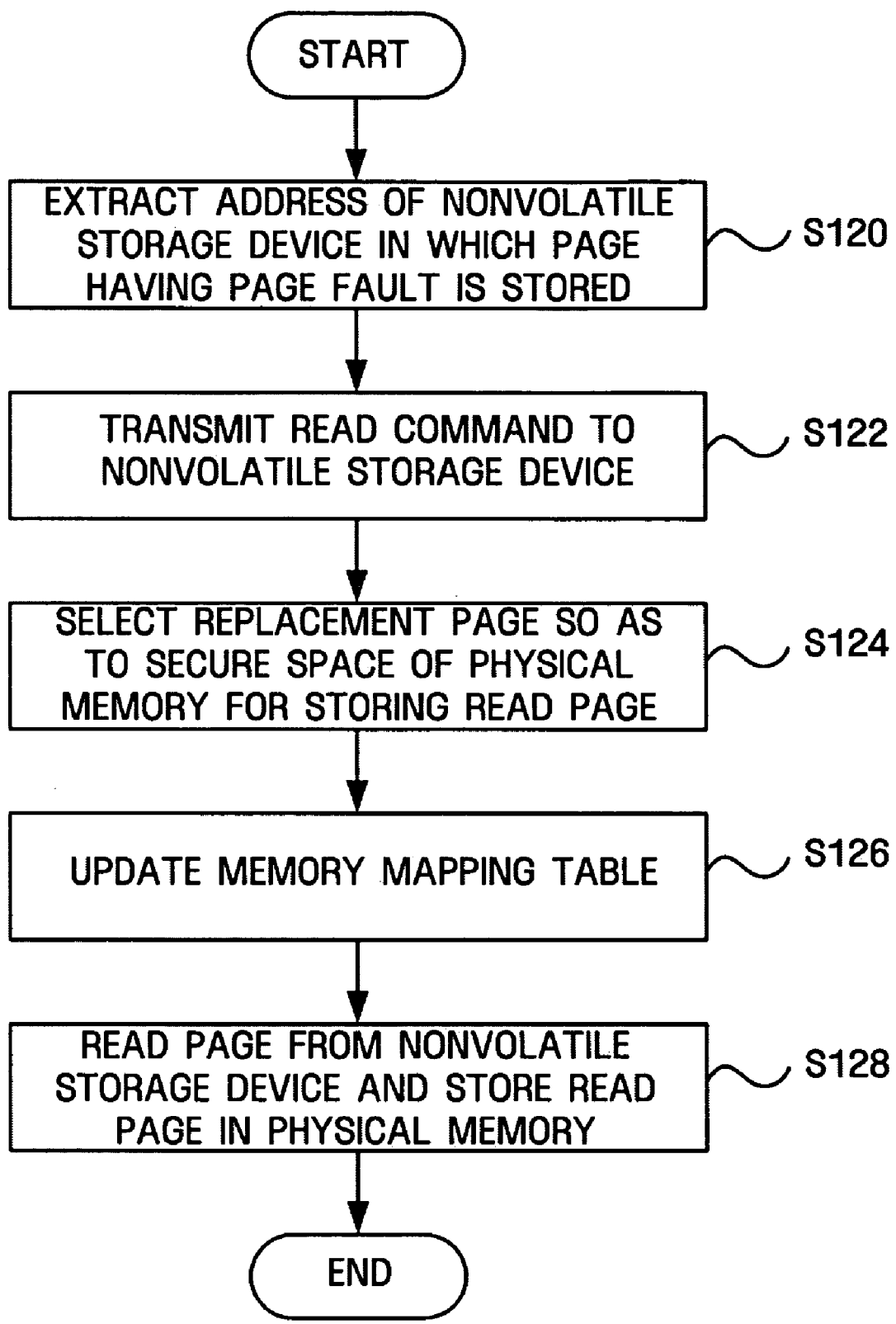
FIG. 7 is a flowchart showing a process of transmitting a read command and performing paging in a memory according to the exemplary embodiment of the invention.

FIG. 7 is a flowchart showing a process of transmitting a read command and performing paging in a memory according to an exemplary embodiment of the invention. FIG. 7 shows a flowchart when the paging process operation shown in FIG. 4 or 6 is performed within the time T at which the physical memory space is secured and the mapping table is updated in FIG. 2.

When a page fault occurs, the corresponding page should be read. Accordingly, an address of a nonvolatile storage device that stores the corresponding page is extracted (Step S120). A mapping table can record such information. The address is transmitted to the nonvolatile storage device, together with the read command (Step S122).

As shown in FIG. 2, it takes a period of time to transmit the read command to the nonvolatile storage device and receive desired data again. Within this time period, a replacement page is selected so as to secure the physical memory space in which the read page is stored (Step S124). The mapping table is updated (Step S126). The corresponding page is read from the nonvolatile storage device and stored in the physical memory (Step S128).

In FIG. 7, Steps S124 and S126 include a case where the back arm and the front arm are moved within the limited time T when the clock algorithm shown in FIG. 4 is used and a case where the valid list and the invalid list are managed within the limited time and a portion that is not completed is replaced during the next limited time when the Mach 2.5 algorithm shown in FIG. 6 is used.

Meanwhile, in this specification, the limited time used in FIG. 4 or 6 is not the same as the limited time T shown in FIG. 2. The operations necessary for the replacement page selection and the invalid list management shown in FIGS. 4 and 6 can be performed at any time if the system is in an idle state. An example of the idle state may be a time at which the system waits to read data from a nonvolatile memory.

Figure 8:
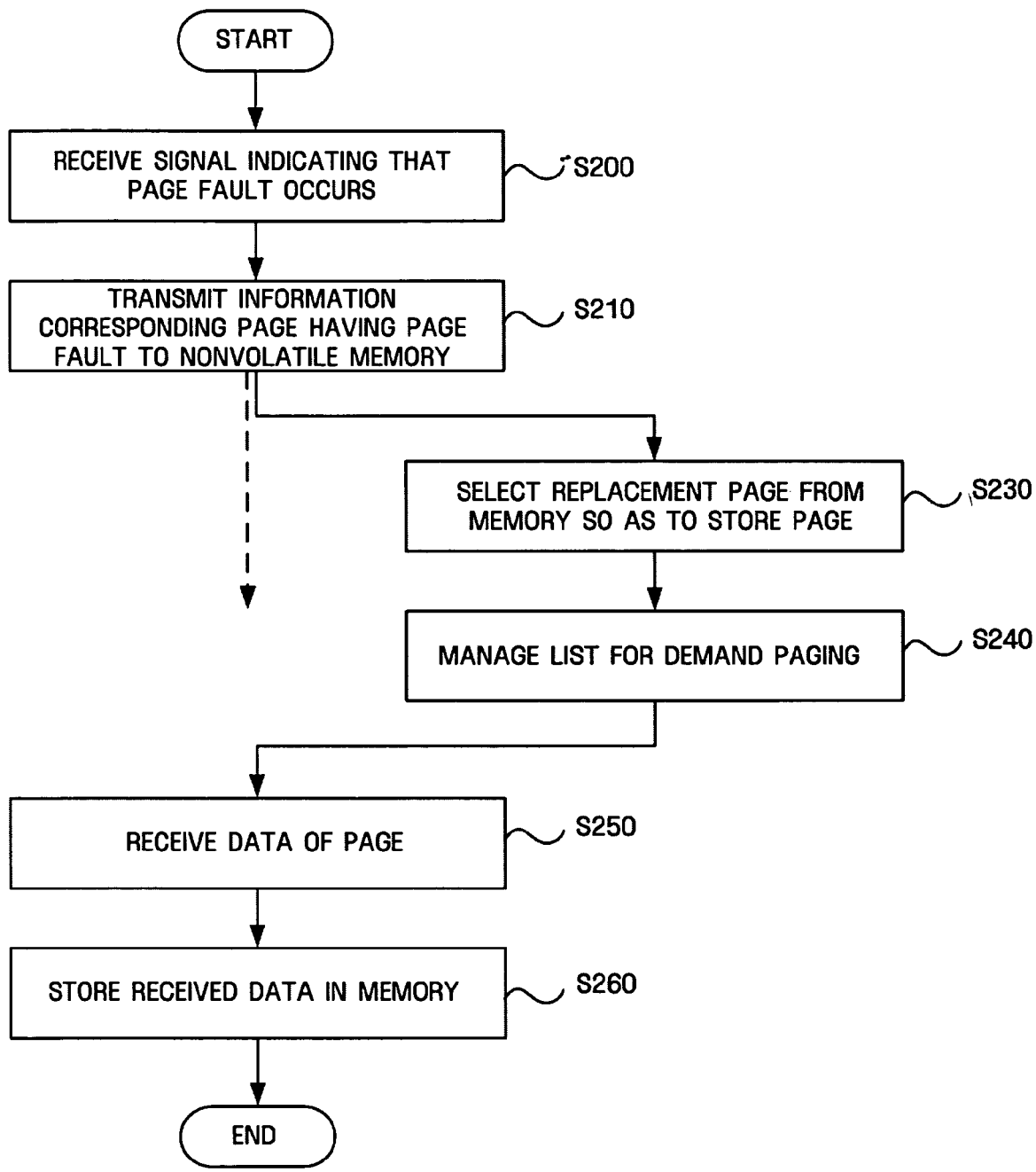
FIG. 8 is a flowchart showing a process of reducing a time required for performing demand paging according to the exemplary embodiment of the invention.

FIG. 8 is a flowchart showing a process of reducing a time required for performing demand paging according to an exemplary embodiment of the invention. A portion of pages is loaded or stored in a memory when demand paging is used. Therefore, if an application requests a predetermined page of the memory, a page fault may occur. When a signal for indicating that a page fault occurs is received (Step S200), information related to the page having the page fault, for example, information including a logical or physical address is transmitted to the nonvolatile memory (Step S210). The operations shown in FIG. 8 may be used for the nonvolatile memory, such as a flash memory, that transmits data to a system through a buffer or a register for data reading. In Step S210, it takes time to transmit page information, for example, address information related to the nonvolatile memory or read the data corresponding to the address. During the time period when the page information is transmitted and the data is read, Steps S230 and S240 are performed. A replacement page is selected from the memory so as to be stored a page read from the nonvolatile memory (Step S230). A list is managed to perform demand paging (Step S240).

Data of the corresponding page is received from the nonvolatile memory (Step S250). The received data is stored in the memory so as to process an operation of the application (Step S260). At this time, operations corresponding to Steps S230 and S240 are performed during a time required for performing the operations in Steps S210 and S250.

In the above-described clock algorithm, Steps S230 and S240 may correspond to a step of moving the pointers (back arm and front arm) managing a plurality of pages to be replaced and of securing a page indicated by the pointer as a space to store the page having the page fault. Of course, Steps S230 and S240 need not be performed between Steps S210 and 250. For example, Steps S230 and S240 can be performed when the system is idle.

Similarly, when the Mach 2.5 algorithm is used, the pages in the memory are divided into the valid list and the invalid list. The valid list includes currently referenced pages and the invalid list includes pages to be replaced. The pages included in the valid and invalid lists may be exchanged with each other. A process of exchanging the pages may be performed in Steps S230 and S240 when the system is idle. A period of idle state of the system may exist between Steps S210 and S250.

Figure 9:
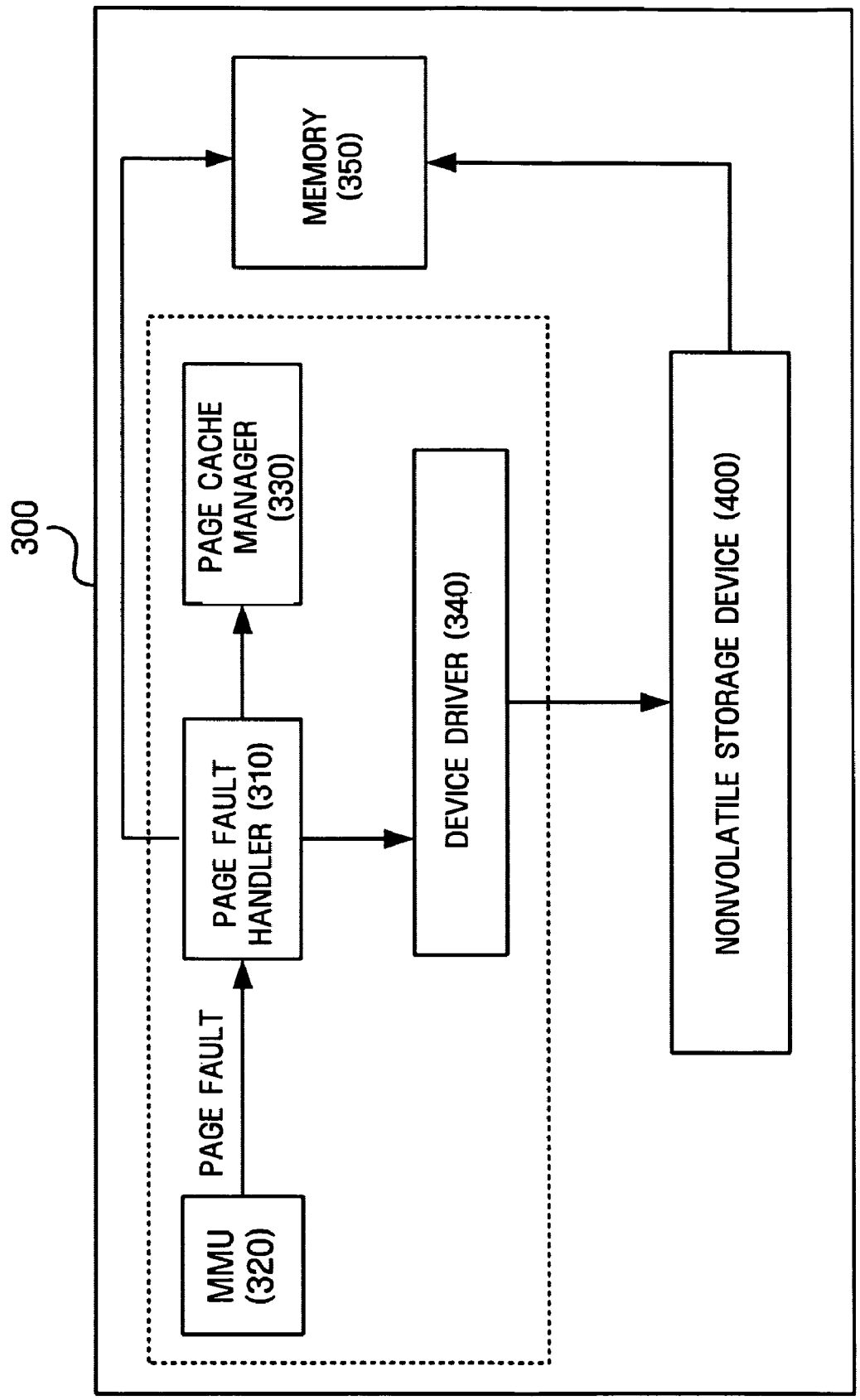
FIG. 9 is a block diagram showing the construction of a system according the exemplary embodiment of the invention.

FIG. 9 is a block diagram showing the construction of a system according an exemplary embodiment of the present invention. Each of the respective components in the exemplary embodiments, may be, but are not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a security multimedia card.

A system or device 300 includes an apparatus having a nonvolatile storage device and may be exemplified by a cellular phone, an MP3 player, a PMP, a PDA, or a notebook computer. A nonvolatile storage device 400 may use a recording medium, such as the above-described flash memory. The nonvolatile storage device 400, that is, the nonvolatile memory can hold data even though the power is not supplied. The nonvolatile storage device 400 can be attached or detached to or from the apparatus in the form of, for example, a card or be incorporated into the device 300.

A memory 350 receives and stores data from the nonvolatile storage device 400. When the data is stored in the memory 350, the power should be supplied. The memory 350 can manage a larger volume of data than an originally storable volume of data by using demand paging. To this end, a memory management unit (MMU) 320 and a page fault handler 310 are provided. The memory management unit 320 transmits, to the page fault handler 310, a signal for indicating that a page fault occurs. The page fault handler 310 extracts information of the page having the page fault, and searches and secures a space of the memory 350 for storing the corresponding page. The page fault handler 310 can use the above-described clock algorithm or the Mach 2.5 algorithm so as to search and secure the space of the memory 350.

A device driver 340 transmits information of the page having the page fault to the nonvolatile storage device 400 and receives data from the nonvolatile storage device 400.

The time required for transmitting the information of the page having the page fault and receiving the data from the nonvolatile storage device may be the idle period on the side of the device 300. The page fault handler 310 searches and secures the space of the memory 350 for storing the corresponding page within the idle period or the limited time calculated beforehand.

A page cache manager 330 caches and manages addresses of the pages, a location at the memory, or the information corresponding to the nonvolatile storage device.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According an aspect of the present invention, it is possible to use a demand paging technique in view of characteristics of the nonvolatile storage device, such as the flash memory.

According an aspect of the invention, it is possible to perform another operation during a time required for reading the data from the nonvolatile storage device.

What is claimed is:

1. A method of reducing a page replacement time in a system using a demand paging technique, the method comprising:

receiving a signal indicating that a page fault occurs;

transmitting information of the page having the page fault to the nonvolatile memory;

receiving data of the page having the page fault from the nonvolatile memory; and searching and securing a space to store the page having the page fault in a memory, wherein the searching and securing of the space in the memory is performed within a limited time calculated beforehand, wherein the limited time is shorter than a time from when the information of the page having the page fault to the nonvolatile memory is transmitted until the data of the page having the page fault is received from the nonvolatile memory.

2. The method of claim 1, wherein the limited time is shorter than a time required for performing reading of the page having the page fault.

3. The method of claim 1, wherein the searching and securing of the space in the memory is performed before the system performs reading of the page having the page fault.

4. The method of claim 1, wherein the searching and securing of the space in the memory comprises:

moving a pointer that manages a plurality of pages to be replaced, the moving of the pointer being performed within the limited time; and securing a page indicated by the moved pointer as a space for storing the page having the page fault.

5. The method of claim 4, wherein the limited time is shorter than a time required for performing the reading of the page having the page fault.

6. The method of claim 1, wherein:

the system divides pages stored in the memory into a first group and a second group for memory management, the first group being a list of pages currently referenced and the second group being a list of pages to be replaced in the future;

the searching and securing of the space in the memory comprises securing a space for storing the page in the second group.

7. The method of claim 6, wherein the searching and securing of the space in the memory further comprises exchanging a page from the first group to the second group within the limited time.

8. An apparatus for reducing a page replacement time, the apparatus comprising:

a nonvolatile storage device which stores data;

a memory which receives and stores the data from the nonvolatile storage device and manages the data through demand paging, the memory configured to store data when power is supplied;

a memory management unit which transmits a signal indicating that a page fault occurs in the memory;

a page fault handler which extracts information of the page having the page fault and searches and secures a space configured to store the page having the page fault in the memory; and a device driver which transmits information of the page having the page fault to the nonvolatile storage device and receives data from the nonvolatile storage device, wherein the page fault handler extracts the information and searches and secures the space within a limited time calculated beforehand, wherein the limited time is shorter than a time from when the device driver receives the information of the page having the page fault in the memory until the data is received from the nonvolatile storage device.

9. The apparatus of claim 8, wherein the limited time is shorter than a time from when the device driver receives the information of the page having the page fault in the memory until the data is received from the nonvolatile storage device.

10. The apparatus of claim 8 wherein the page fault handler searches and secures the space in the memory before the device driver receives the data from the nonvolatile storage device.

11. The apparatus of claim 8, wherein:
the page fault handler moves a pointer that manages a plurality of pages to be replaced, and secures a page indicated by the moved pointer as a space for storing the page having the page fault; and
the pointer is moved within the limited time.

12. The apparatus of claim 11, wherein the limited time is shorter than a time from when the device driver receives the information of the page having the page fault in the memory until the data is received from the nonvolatile storage device.

13. The apparatus of claim 8, wherein:
the page fault handler divides pages stored in the memory into a first group and a second group for memory management, the first group being a list of pages currently referenced and the second group being a list of pages to be replaced in the future;
the searching and securing of the memory space comprises securing a space for storing the page in the second group.

14. The apparatus of claim 13, wherein a page to be exchanged or arranged between the first and second groups is moved within the limited time.

15. The apparatus of claim 9, wherein the nonvolatile storage device comprises a flash memory and a buffer or a register that transmits data of the flash memory to the apparatus for reducing a page replacement time.

16. A method of reducing a page replacement time in a system using a page demand paging technique, the method comprising:
receiving a signal indicating that a page fault occurs;
transmitting information of the page having the page fault to a nonvolatile memory;
receiving data of the page having the page fault from a nonvolatile memory into a buffer; and
searching and securing a space to store the page having the page fault in a memory within a time from when the information of the page having the page fault to the nonvolatile memory is transmitted until the data of the page having the page fault is received from the nonvolatile memory.

17. The method of claim 16, wherein the searching and securing a space to store the page having the page fault is completed before the reading of the page having the page fault is completed.

* * * * *